3,070,628
4-ALLYLOXYBENZYLAMINES
Alan J. Lemin, Richland Township, Kalamazoo County, Mich., assignor to The Upjohn Company, Kalamazoo, Mich., a corporation of Delaware
No Drawing. Filed Aug. 4, 1959, Ser. No. 831,487
7 Claims. (Cl. 260—570.9)

This invention relates to novel derivatives of benzylamine and is more particularly concerned with novel derivatives of p-allyloxybenzylamine and the acid addition salts thereof.

The novel compounds of the invention are selected from the class consisting of (a) compounds having the general formula:

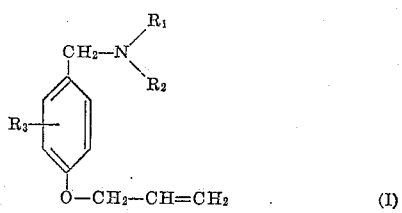

(I)

wherein $R_1$ and $R_3$ are selected from the class consisting of hydrogen and alkyl containing from 1 to 3 carbon atoms, inclusive, $R_2$ represents alkyl containing from 1 to 3 carbon atoms, inclusive, the total number of carbon atoms in the radicals $R_1$, $R_2$ and $R_3$ being not greater than 6, and (b) the acid addition salts thereof.

The term "alkyl containing from 1 to 3 carbon atoms, inclusive," includes methyl, ethyl, propyl and isopropyl groups.

The novel compounds of the invention exhibit valuable pharmacological activity. Illustratively, the compounds of the invention are enzyme inhibitors. Thus, for example, the compounds of the invention inhibit the enzyme system, monoamine oxidase, and are active, when administered orally, in inhibiting this enzyme system in the brain and liver. Monoamine oxidase is responsible for the destruction in the body of a number of physiologically active amines, including serotonin, and hence compounds which inhibit this enzyme system provide a means of regulating the rate at which said amines are destroyed in the body.

The novel compounds of the invention are also useful, in accordance with U.S. Patents 1,915,334 and 2,075,359, in forming amine fluosilicate mothproofing agents, and, in accordance with U.S. Patents 2,425,320 and 2,606,155, in forming amine thiocyanate-formaldehyde condensation products for use as pickling inhibitors.

The novel compounds of the invention can be prepared advantageously using the following procedure. A p-allyloxybenzoic acid having the formula:

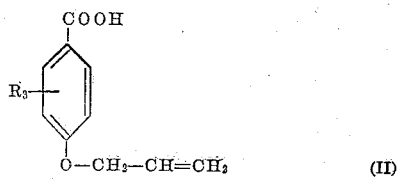

(II)

wherein $R_3$ has the significance hereinbefore defined, is amidated in a manner known in the art for the preparation of benzamides. Illustratively, the p-allyloxybenzoic acid (II) is converted to its acid halide, for example, by reaction with thionyl halides, phosphoryl halides, or like acid halogenating agents, and the p-allyloxybenzoyl halide thus obtained is condensed with an amine

wherein $R_1$ and $R_2$ have the significance hereinbefore defined, to produce the corresponding p-allyloxybenzamide. The p-allyloxybenzamide so obtained is then subjected to reduction, preferably with lithium aluminum hydride, to obtain the desired benzylamine having the Formula I above. Advantageously the reduction is effected by adding the amide to a suspension of lithium aluminum hydride in an inert solvent, such as ether, under anhydrous conditions. After the addition is complete the reaction mixture is preferably heated under reflux for a period of several hours before being decomposed by the addition of water and aqueous alkali metal hydroxide. The desired amine having the Formula I above is isolated by conventional methods, for example, by extraction in a solvent followed by recrystallization, when the amine is a solid, or by distillation where the amine is a liquid. The amount of lithium aluminum hydride employed in the above reduction is advantageously in excess of the stiochiometric quantity.

The p-allyloxybenzoic acids having the Formula II above can be prepared by etherification of the corresponding p-hydroxybenzoic acid having the formula:

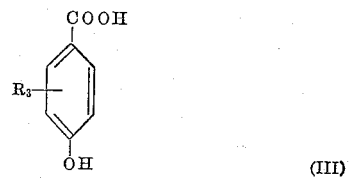

(III)

wherein $R_3$ has the significance hereinbefore defined. The etherification can be carried out in a convenient manner by reacting the p-hydroxybenzoic acid (III) or an ester thereof, for example, a lower-alkyl ester, with an allyl halide, for example, allyl chloride or allyl bromide, in the presence of a base such as an alkali metal alkoxide, anhydrous potassium carbonate, and the like. The ester of the p-allyloxybenzoic acid so obtained is then subjected to hydrolysis, for example, using aqueous alkali metal hydroxide, to yield the desired compound having the Formula II.

Many of the p-hydroxybenzoic acids having the Formula III are known in the art. The known compounds having the Formula III include p-hydroxybenzoic acid, 4-hydroxy-2-methylbenzoic acid [Beilsteins Handbuch der Organischen Chemie, Fourth Edition, (1927), vol. 10, p. 214], 4-hydroxy-3-methylbenzoic acid (Beilstein, ibid., p. 225), 3-ethyl-4-hydroxybenzoic acid (Chem. Zentr. 1942, II, 1227), and 4-hydroxy-3-isopropylbenzoic acid [Proc. Jap. Acad. 26, No. 10, 25 (1950); C.A. 45, 8498, 1951]. The compounds having the Formula III can be prepared by methods known in the art. For example, the compounds having the Formula III can be prepared from the corresponding phenols by heating the latter with carbon tetrachloride and alcoholic potash in the presence of copper according to the process described in British Patent 258,887. The phenols employed as starting materials in said process are well-known in the art; see, for example, "Chemistry of Carbon Compounds," vol. IIIA, pp. 420–1, edited by E. H. Rodd, Elsevier, New York, 1954.

The compound having the Formula III above in which $R_3$ represents 3-propyl, i.e., 4-hydroxy-3-propylbenzoic acid, can also be prepared in a convenient manner in the form of its ethyl ester by catalytic hydrogenation of ethyl 3-allyl-4-hydroxybenzoate [Claisen and Eisleb, Ann. 401, 21 (1913)]. The hydrogenation is carried out in a conventional manner using a catalyst such as platinum oxide and the ester so obtained can be hydrolyzed to the free acid and then etherified, or it can be etherified and then hydrolyzed, in either case using an allyl halide as described above, to yield the corresponding 4-allyloxy-3-propylbenzoic acid [II; $R_3$=3-propyl].

The compounds of the invention having the Formula I above can also be prepared by amidating a p-hydroxybenzoic acid having the Formula III above using the process hereinbefore described to obtain the corresponding p-hydroxybenzamide, converting the latter to its allyl ether, for example, by reaction with allyl bromide in the presence of a base such as anhydrous potassium carbonate, and reducing the p-allyloxybenzamide so obtained to the corresponding p-allyloxybenzylamine having the Formula I above, for example, using lithium aluminum hydride in the manner described above.

The acid addition salts of the invention comprise the salts of free bases having the Formula I above with organic and inorganic monobasic and polybasic acids. Advantageously, acids such as hydrochloric, hydrobromic, hydriodic, sulfuric, phosphoric, nitric, acetic, benzoic, salicylic, glycolic, succinic, nicotinic, ascorbic, tartaric, maleic, malic, lactic, alginic, cyclohexylsulfamic acids, and like pharmacologically acceptable acids are used, especially when the acid addition salt is intended for therapeutic use. The acid addition salts of the invention can be prepared in a convenient manner by reacting stoichiometric proportions of the acid and a free base compound having the Formula I in the presence of a suitable solvent such as water, acetone, dioxane, ethyl acetate, methanol, ethanol, isopropanol, ether, and the like.

When used in therapy, especially in mammals, the novel compounds of the invention, in free base form or in the form of pharmacologically acceptable acid addition salts, can be combined with solid or liquid pharmaceutical carriers and formulated in the form of tablets, powder packets, or capsules, using starch and like excipients, particularly in the case of those compounds which are solids at temperatures below about 50° C. In the case of those compounds which are liquids at ordinary temperature, it is preferred to encapsulate them, e.g., in soft elastic capsules or hard-filled capsules. The novel compounds of the invention can also be dissolved or suspended in suitable solvents or vehicles, for oral or parenteral administration.

The following examples are illustrative of the process and products of the present invention, but are not to be construed as limiting.

EXAMPLE 1

*4-Allyloxy-N,N-Dimethylbenzylamine and the Hydrochloride Thereof*

(A) *4-allyloxy - N,N - dimethylbenzamide*.—A mixture of 35.6 g. (0.2 mole) of 4-allyloxybenzoic acid and 100 ml. (1.37 moles) of thionyl chloride was heated under reflux for 1 hr. The excess thionyl chloride was then distilled under reduced pressure and 50 ml. of benzene was added to the residue. The resulting mixture was distilled under reduced pressure to remove the benzene and the last traces of thionyl chloride. The residue was poured slowly with stirring into 108 g. of 25% aqueous dimethylamine solution (representing 0.6 mole of dimethylamine). After the vigorous reaction had subsided and the reaction mixture had cooled to about 25° C., 200 ml. of ether was added and the mixture was shaken. The organic layer was separated, washed successively with two 100 ml. portions of water, three 100 ml. portions of 10% hydrochloric acid, and finally with water until the washings were neutral. The ethereal solution was then dried over anhydrous sodium sulfate, filtered, and the filtrate evaporated to dryness. The oily residue (29.5 g.) was distilled under reduced pressure. There was thus obtained 4-allyloxy-N,N-dimethylbenzamide in the form of an oil having a boiling point of 116° C. at a pressure of 0.04 mm. of mercury; $n_D^{25}=1.5517$.

*Analysis*.—Calcd. for $C_{12}H_{15}NO_2$: C, 70.21; H, 7.37; N, 6.82. Found: C, 70.23; H, 7.42; N, 6.70.

(B) *4-allyloxy-N,N-dimethylbenzylamine*.—A solution of 26.0 g. (0.127 mole) of 4-allyloxy-N,N-dimethylbenzamide in 100 ml. of anhydrous ether was added slowly to a stirred suspension of 9.65 g. (0.253 mole) of lithium aluminum hydride in 250 ml. of anhydrous ether. The resulting mixture was stirred and heated under reflux for 22 hrs. The reaction mixture was then cooled and decomposed by the addition of 80 ml. of ethyl acetate followed by 120 ml. of a saturated aqueous solution of sodium sulfate. To the resulting two-phase mixture containing a white precipitate was added 250 ml. of ether and 50 g. of anhydrous sodium sulfate. The mixture so obtained was filtered and the insoluble material was washed on the filter with 100 ml. of ether. The combined filtrate and washings were distilled to remove the solvent and the residue was then distilled under reduced pressure. There was thus obtained 21.82 g. of 4-allyloxy-N,N-dimethylbenzylamine having a boiling point of 66 to 67° C. at a pressure of 0.05 mm. of mercury; $n_D^{25}=1.5140$.

*Analysis*.—Calcd. for $C_{12}H_{17}NO$: N, 7.32. Found: N, 7.53.

(C) *4-allyloxy-N,N-dimethylbenzylamine hydrochloride*.—Dry hydrogen chloride gas was bubbled into a solution of 17.2 g. of 4-allyloxy-N,N-dimethylbenzylamine in 150 ml. of anhydrous ether until no further precipitate separated. The oily precipitate so obtained was isolated by filtration and recrystallized from ether containing 10% by volume of ethanol. There was thus obtained 15.47 g. of the hydrochloride of 4-allyloxy-N,N-dimethylbenzylamine in the form of a crystalline solid having a melting point of 131° C.

*Analysis*.—Calcd. for $C_{12}H_{18}ClNO$: C, 63.30; H, 7.97; N, 6.13; Cl, 15.61. Found: C, 63.38; H, 7.98; N, 6.39; Cl, 15.58.

EXAMPLE 2

*4-Allyloxy-N-Methylbenzylamine and the Hydrochloride Thereof*

(A) *4-allyloxy-N-methylbenzamide*.—To 284 g. of 25% aqueous methylamine solution (representing 2.29 moles of methylamine) was added slowly, with stirring, 100 g. (0.51 mole) of 4-allyloxybenzoyl chloride (prepared as described in Example 1A). The resulting mixture was heated on a steam bath for 0.5 hr. and then allowed to cool to about 25° C. The mixture was extracted with ether and the ethereal extract was washed successively with water, dilute hydrochloric acid, and water before being dried over anhydrous sodium sulfate. The dried solution was filtered and the filtrate was evaporated. The solid residue was recrystallized from aqueous ethanol. There was thus obtained 78.7 g. of 4-allyloxy-N-methylbenzamide in the form of a white crystalline solid having a melting point of 101 to 102° C.

*Analysis*.—Calcd. for $C_{11}H_{13}NO_2$: C, 69.09; H, 6.85; N, 7.33. Found: C, 69.19; H, 6.88; N, 7.25.

(B) *4-allyloxy-N-methylbenzylamine*.—To 18 g. (0.5 mole) of lithium aluminum hydride in 500 ml. of anhydrous ether was added slowly, with stirring, a solution of 58 g. (0.3 mole) of 4-allyloxy-N-methylbenzamide in 300 ml. of dry tetrahydrofuran. The mixture was heated under reflux for 6 hr. and then allowed to cool to about 25° C. To the mixture were added in succession 92.5 ml. of ethyl acetate, 20 ml. of water, 15 ml. of 20% aqueous sodium hydroxide solution, and 70 ml. of water. The resulting mixture was filtered and the insoluble material was washed on the filter with ether. The filtrate and washings were combined and extracted with 200 ml. of dilute hydrochloric acid. The acid extract was washed with ether and then made alkaline by the addition of an excess of aqueous sodium hydroxide solution. The oil which separated was extracted with ether and the ethereal extract was washed with water and then with saturated aqueous sodium chloride solution before being dried over anhydrous potassium carbonate. The dried solution was filtered and the filtrate was evaporated. The residue was distilled under reduced pressure. There was thus obtained 47.5 g. of 4-allyloxy-N-methylbenzylamine in the form of an oil having a boiling point of 76° C. at a pressure of 0.025 mm. of mercury; $n_D^{25}=1.5193$.

(C) *4-allyloxy-N-methylbenzylamine hydrochloride.*—A solution of 20 g. of 4-allyloxy-N-methylbenzylamine in 300 ml. of anhydrous ether was acidified by addition of an ethanolic hydrogen chloride solution. The solid which separated was isolated by filtration and recrystallized from methyl ethyl ketone. There was thus obtained 4-allyloxy-N-methylbenzylamine hydrochloride in the form of a white crystalline solid having a melting point of 162 to 163° C.

*Analysis.*—Calcd. for $C_{11}H_{16}ClNO$: C, 61.82; H, 7.55; N, 6.56; Cl, 16.59. Found: C, 61.89; H, 7.88; N, 6.41; Cl, 16.43.

EXAMPLE 3

*4-Allyloxy-3-Propyl-N,N-Dimethylbenzylamine and the Hydrochloride Thereof*

(A) *Ethyl 4-hydroxy-3-propylbenzoate.*—A solution of 103 g. (0.5 mole) of ethyl 3-allyl-4-hydroxybenzoate in 150 ml. of ethanol was shaken with 0.2 g. of platinum oxide in the presence of hydrogen at an initial pressure of 50 p.s.i. The theoretical quantity of hydrogen was absorbed in 1 hr. The reaction mixture was then filtered and the filtrate was combined with the filtrates from four similar runs. The combined filtrates represented the total crude reaction product obtained from 503.3 g. (2.44 moles) of ethyl 3-allyl-4-hydroxybenzoate. The combined filtrates were distilled to remove the solvent and the solid residue was collected, washed with pentane, and dried. There was thus obtained 453.6 g. of ethyl 4-hydroxy-3-propylbenzoate in the form of a crystalline solid having a melting point of 77.5 to 80.5° C. A further 21.3 g. of this material was obtained by concentration of the pentane washings.

(B) *Ethyl 4-allyloxy-3-propylbenzoate.*—A mixture of 424.3 g. (2.04 moles) of ethyl 4-hydroxy-3-propylbenzoate, 414 g. (3 moles) of potassium carbonate, 363 g. (3 moles) of allyl bromide and 2.2 l. of acetone was heated under reflux with stirring for 10 hr. The solid which separated was isolated by filtration and washed with acetone. The combined filtrate and washings were evaporated and the oily residue was dissolved in ether. The ether solution was washed successively with cold 10% aqueous sodium hydroxide solution, water, and saturated aqueous sodium chloride solution, before being dried over anhydrous sodium sulfate. The dried solution was filtered and the filtrate was evaporated. The residue was distilled under reduced pressure. There was thus obtained 479.6 g. of ethyl 4-allyloxy-3-propylbenzoate in the form of a liquid having a boiling point of 116° C. at a pressure of 0.05 mm. of mercury; $n_D^{25}=1.5178$.

*Analysis.*—Calcd. for $C_{15}H_{20}O_3$: C, 72.55; H, 8.12. Found: C, 72.77; H, 8.02.

(C) *4-allyloxy-3-propylbenzoic acid.*—A solution of 429.8 g. (1.73 moles) of ethyl 4-allyloxy-3-propylbenzoate and 460 g. (11.5 moles) of sodium hydroxide in a mixture of 5 l. of water and 1.5 l. of ethanol was heated under reflux for 6 hr. The resulting mixture was distilled until most of the ethanol had been removed and the residue was treated with water. The aqueous solution was extracted with ether before being acidified by the addition of hydrochloric acid. The solid which separated was isolated by filtration, washed with water, and dried. There was thus obtained 349.8 g. of 4-allyloxy-3-propylbenzoic acid in the form of a crystalline solid having a melting point of 125 to 126° C.

(D) *4-allyloxy-3-propyl-N,N-dimethylbenzamide.* — A solution of 160 g. (0.8 mole) of 4-allyloxy-3-propylbenzoic acid and 105 ml. of thionyl chloride in 260 ml. of benzene was heated under reflux for 4 hr. The solvent and the excess thionyl chloride were removed by distillation under reduced pressure and the residue was added slowly with stirring to 445 g. of 25% aqueous dimethylamine solution (representing 2.47 moles of dimethylamine). The mixture was stirred for 0.5 hr. and then extracted with ether. The ether extract was washed successively with water, dilute hydrochloric acid, water, and saturated aqueous sodium chloride solution and then dried over anhydrous sodium sulfate. The dried solution was filtered and the filtrate was evaporated to remove the solvent. The residue was distilled under reduced pressure. There was thus obtained 163.2 g. of 4-allyloxy-3-propyl-N,N-dimethylbenzamide in the form of a crystalline solid having a melting point of 40 to 41° C.

*Analysis.*—Calcd. for $C_{15}H_{21}NO_2$: C, 72.84; H, 8.56; N, 5.66. Found: C, 72.97; H, 8.61; N, 5.74.

(E) *4-allyloxy-3-propyl-N,N-dimethylbenzylamine.* — To 25 g. (0.66 mole) of lithium aluminum hydride in 600 ml. of anhydrous ether was added slowly, with stirring, a solution of 112.8 g. (0.45 mole) of 4-allyloxy-3-propyl-N,N-dimethylbenzamide in 350 ml. of tetrahydrofuran. The mixture was heated under reflux with stirring for 15 hr. The cooled reaction mixture was then treated successively, with stirring, with 122 ml. of ethyl acetate, 26.4 ml. of water, 19.8 ml. of 20% aqueous sodium hydroxide solution, and 92.5 ml. of water. The solid which separated was isolated by filtration and washed on the filter with ether. The combined filtrate and washings were washed with water and extracted with dilute hydrochloric acid. The aqueous acid solution was washed with ether and then made basic by the addition of aqueous sodium hydroxide solution. The oil which separated was extracted with ether and the ether extract was washed with water and then with saturated aqueous sodium chloride solution before being dried over anhydrous potassium carbonate. The dried ether solution was filtered and the filtrate was evaporated. The residue was distilled under reduced pressure. There was thus obtained 97 g. of 4-allyloxy-3-propyl-N,N-dimethylbenzylamine in the form of an oil having a boiling point of 82° C. at a pressure of 0.025 mm. of mercury; $n_D^{25}=1.5078$.

*Analysis.*—Calcd. for $C_{15}H_{23}NO$: C, 77.20; H, 9.94; N, 6.00. Found: C, 77.85; H, 10.45; N, 6.46.

(F) *4-allyloxy-3-propyl-N,N-dimethylbenzylamine hydrochloride.*—A solution of 66.5 g. of 4-allyloxy-3-propyl-N,N-dimethylbenzylamine in anhydrous ether was acidified by the addition of ethanolic hydrogen chloride solution. The solid which separated was isolated by filtration, washed with ether, and recrystallized from methyl ethyl ketone. There was thus obtained 73.2 g. of 4-allyloxy-3-propyl-N,N-dimethylbenzylamine hydrochloride in the form of a crystalline solid having a melting point of 123 to 124 ° C.

*Analysis.*—Calcd. for $C_{15}H_{24}ClNO$: C, 66.77; H, 8.97; N, 5.19; Cl, 13.14. Found: C, 66.66; H, 8.67; N, 5.13; Cl, 13.10.

EXAMPLE 4

*4-Allyloxy-3-Methyl-N,N-Dimethylbenzylamine and the Hydrochloride Thereof*

In a 3-liter flask was placed 127.7 g. (0.84 mole) of 4-hydroxy-3-methylbenzoic acid in 400 ml. of methanol. The flask was fitted with stirrer, reflux condenser and 2 dropping funnels. In one funnel was placed a solution of 80 g. (3.5 moles) of sodium in 1.2 liters of methanol; in the other funnel was placed 346 ml. (4.0 moles) of allyl bromide. One-half of the sodium methoxide solution and one-half of the allyl bromide were added with stirring and the mixture was heated (about 3 hr.) under reflux until neutral. Then one-half of the remaining sodium methoxide solution and one-half of the remaining allyl bromide were added and the mixture was again heated (about 1 hr.) under reflux until neutral. The remainder of the sodium methoxide solution and the allyl bromide were added and the refluxing was continued for 5 hr. until the mixture was again neutral. About 1 liter of solvent was distilled to remove excess allyl bromide and 130 ml. of 50% aqueous sodium hydroxide solution and 300 ml. of water were added. After heating under reflux for 2 hr. most of the remaining solvent was removed under reduced pressure on the steam bath and water was added. The mixture was extracted twice with ether and the ether extracts were combined and extracted twice with water. The aqueous extracts were combined and acidified. The suspension so obtained was warmed while bubbling in nitrogen to remove ether and the solid was collected by filtration, washed with water, dried and recrystallized from ethanol. There was thus obtained 4-allyloxy-3-methylbenzoic acid in the form of a crystalline solid.

The 4-allyloxy-3-methylbenzoic acid so obtained was then converted, using the procedure described in Example 3, Parts D, E and F, to 4-allyloxy-3,N,N-trimethylbenzylamine and the hydrochloride thereof.

In similar manner, but replacing 4-hydroxy-3-methylbenzoic acid by 4-hydroxy-2-methylbenzoic acid, 3-ethyl-4-hydroxybenzoic acid, and 4-hydroxy-3-isopropylbenzoic acid, there are obtained 4-allyloxy-2,N,N-trimethylbenzylamine, 4-allyloxy-3-ethyl-N,N-dimethylbenzylamine, and 4-allyloxy-3-isopropyl-N,N-dimethylbenzylamine, respectively, and the hydrochlorides thereof.

EXAMPLE 5

*4-Allyloxy-N,N-Diethylbenzylamine and the Hydrochloride Thereof*

Using the procedure described in Example 1, but replacing the dimethylamine employed in Part A by diethylamine, there was obtained 4-allyloxy-N,N-diethylbenzylamine and the hydrochloride thereof.

In similar manner, but replacing diethylamine by methylethylamine, dipropylamine and diisopropylamine, there are obtained 4-allyloxy-N-ethyl-N-methylbenzylamine, 4-allyloxy-N,N-dipropylbenzylamine, and 4-allyloxy-N,N-diisopropylbenzylamine, respectively, and the hydrochlorides thereof.

EXAMPLE 6

*4-Allyloxy-N-Isopropylbenzylamine and the Hydrochloride Thereof*

Using the procedure described in Example 2, but replacing methylamine by isopropylamine, there was obtained 4-allyloxy-N-isopropylbenzylamine and the hydrochloride thereof.

In similar manner, but replacing isopropylamine by ethylamine and propylamine, there are obtained 4-allyloxy-N-ethylbenzylamine and 4-allyloxy-N-propylbenzylamine, respectively, and the hydrochlorides thereof.

EXAMPLE 7

Ten thousand (10,000) tablets for oral use, each containing 25 mg. of 4-allyloxy-N,N-dimethylbenzylamine hydrochloride, are prepared from the following types and amounts of material:

| | Gms. |
|---|---|
| 4-allyloxy - N,N - dimethylbenzylamine hydrochloride | 250 |
| Starch U.S.P. | 170 |
| Talc U.S.P. | 130 |
| Lactose U.S.P. | 2600 |
| Sucrose powder U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets of the proper weight.

I claim:
1. A compound selected from the class consisting of (*a*) compounds having the general formula:

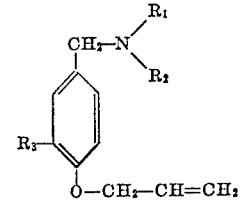

wherein $R_1$ and $R_3$ are selected from the class consisting of hydrogen and alkyl containing from 1 to 3 carbon atoms, inclusive, $R_2$ represents alkyl containing from 1 to 3 carbon atoms, inclusive, the total number of carbon atoms in the radicals $R_1$, $R_2$, and $R_3$ being not greater than 6, and addition salts thereof with pharmacologically acceptable acids.
2. 4-allyloxy-N,N-dimethylbenzylamine.
3. 4-allyloxy-N,N-dimethylbenzylamine hydrochloride.
4. 4-allyloxy-N-methylbenzylamine.
5. 4-allyloxy-N-methylbenzylamine hydrochloride.
6. 4-allyloxy-3-propyl-N,N-dimethylbenzylamine.
7. 4-allyloxy - 3 - propyl-N,N-dimethylbenzylamine hydrochloride.

References Cited in the file of this patent
UNITED STATES PATENTS

| 2,499,213 | De Benneville et al. | Feb. 28, 1950 |
| 2,783,277 | Hiltmann | Feb. 26, 1957 |
| 2,912,453 | Moffett | Nov. 10, 1959 |